April 15, 1969     D. A. LINCOLN     3,438,144
ARTICULATED CRAWFISH FISHING LURE
Filed March 31, 1967
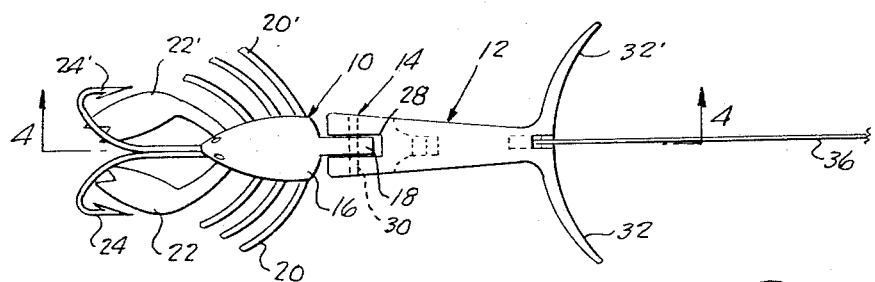
FIG. 1.
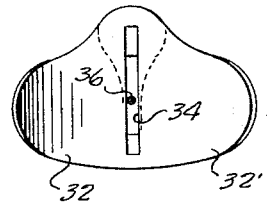
FIG. 2.
FIG. 3.
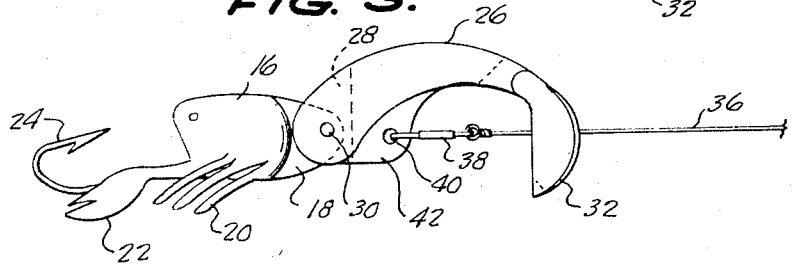
FIG. 4.
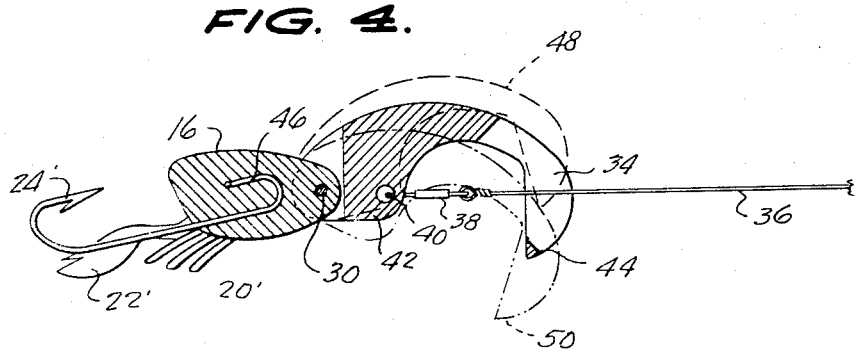
INVENTOR.
DONALD A. LINCOLN,
BY
*Kimmel, Crowell & Weaver.*
ATTORNEYS.

United States Patent Office 3,438,144
Patented Apr. 15, 1969

3,438,144
ARTICULATED CRAWFISH FISHING LURE
Donald A. Lincoln, 6740 Hillglen Way,
Fair Oaks, Calif. 95628
Filed Mar. 31, 1967, Ser. No. 627,417
Int. Cl. A01k 85/00
U.S. Cl. 43—42.15         6 Claims

ABSTRACT OF THE DISCLOSURE

A crawfish-shaped articulated fishing lure having a head member, a longitudinally upwardly convex and downwardly concave tail member, a pivotal connection therebetween, a slot in the tail member for permitting passage of a fishing line therethrough, and a pair of hooks extending from the head member so arranged as to permit the tail member to oscillate vertically relative to the head member when the fishing lure is pulled through the water. The fishing line is fixedly connected to the tail member intermediate of the pivotal connection and the distal end of the tail member but closer to the pivotal connection.

BACKGROUND OF THE INVENTION

Field of the invention

This invention relates to fishing lures and more particularly to artificial articulated fishing lures wherein two portions are pivotally interconnected for relative movement therebetween.

Description of the prior art

Articulated fishing lures are not, in themselves, novel with this invention. Such fishing lures are described in Patent Nos. 1,021,699, 1,585,943, 2,291,422, 2,758,409 and 2,910,799. These articulated fishing lures are sometimes designed to imitate the movement of a creature through the water. Generally such movement has not been closely parallel to the actual movement of such a creature. It is, therefore, an object of this invention to closely simulate the movement of a crawfish through the water by a novel articulated arrangement and interconnection between the fishing line and the fishing lure.

Summary

The objects and purposes of this invention include the provision of a crawfish-shaped fishing lure having a head portion formed to simulate the head of a crawfish having a pair of pincers extending therefrom and a pair of hooks extending approximately to the pincers, a generally planar portion extending rearwardly from the head received in a slot in a tail portion with a pin pivotally interconnecting the tail and head portion. The tail portion is generally arcuately shaped and has formed in the distal end thereof a vertically disposed slot through which the fishing line extends to a connection rearwardly of the pivotal connection. This novel combination of articulated members and interconnection to the fishing line causes the tail portion to vertically oscillate relative to the head portion and the fishing line when it is pulled through the water. This combination of features, constructions, elements, and connections constitutes an essential part and object of this invention.

Brief description of the drawing

FIGURE 1 is a top plan view of the fishing lure of this invention shown connected to a fishing line.

FIGURE 2 is a rear view of the fishing lure of this invention showing the extension of the fishing line through a vertically disposed slot in the tail member.

FIGURE 3 is a side elevational view of the fishing lure showing the interconnection thereof to a fishing line.

FIGURE 4 is a side view taken substantially along lines 4—4 shown in cross-section with the vertical oscillatory movement of the tail member being shown in dotted lines.

Description of the preferred embodiments

As shown best in FIGURES 1, 3 and 4, the fishing lure of this invention comprises a head member 10 and a tail member 12 which are pivotally interconnected as shown generally at 14.

The head member 10 comprises a central portion 16 and includes a rearwardly extending generally planar vertically oriented portion 18, a plurality of crawlers or legs 20 disposed on the sides of the central portion and a pair of pincer-like extensions 22 extending forwardly from the head to simulate the shape of a crawfish. A pair of hooks 24 extend in proximity to the pincers. The tail member 12 is generally longitudinally upwardly convex and downwardly concave to be arcuate in shape having a central bight portion 26 and is provided with a vertically oriented slot 28 which receives the vertically oriented planar portion 18 of head 10. A pin 30 loosely pivotally connects the head and tail members by loosely securing the planar member 18 in the slot 28, as shown in FIGURES 1, 2 and 3. The tail member also includes a pair of oppositely diverging arcuate portions 32 extending from the respective sides thereof outwardly and rearwardly from the ditsal end of the tail member. The distal end of the tail member is also provided with a vertically oriented slot 34 through which a fishing line 36 extends for connection by a conventional fishing lure connector 38 in an aperture 40 in a generally vertically oriented boss extending into the arcuate space encompassed by the tail member. The aperture 40 is located closer to the pivot pin 30 than to the distal end of the tail member at 32.

As shown best in FIGURE 4, the bottom of the distal end of the tail member is connected together as shown at 44 to limit the vertical oscillatory movement of the tail member relative to the fishing line 36. Also as shown in FIGURE 4, the hooks 24 are connected by embedding a hook 46 in the central portion 16 of the head member 10.

It will be understood that the lure may be made of any convenient material such as extruded or cast plastics, plasters, etc. It will also be understood that the lure will be ornamented and painted in such a manner as to closely simulate the appearance of a crawfish. In some instances it may be desirable to accentuate some of the colors to make the lure more attractive.

The central and dominant feature of this invention which distinguishes it from the lures previously known is the co-operative manner in which the two elements of the fishing lure are pivotally interconnected and the manner and the position of the connection of the fishing lure to a fishing line. By connecting the fishing line to the vertically oriented opening 34 in the tail 10 to the boss 42 and pulling on line 36 the movement of the lure through the water will cause the tail 12 to pivotally vertically oscillate relative to the line 36 and relative to the head 10. This vertical oscillatory movement about pivot pin 30 is shown in FIGURE 4 in dotted lines. This approximates the appearance of a crawfish actually moving through the water and attracts fish to the lure. It is not necessary, with respect to the present lure, to vary the amount of force exerted on the end of line 36 since by the novel interconnection positions of the line and the pivot point the tail is not stable in any position but rather tends to oscillate from one semi-stable position as shown at 48 to another semi-stable position as shown at 50 in FIGURE 4.

It will thus be seen that while the lure is mechanically simple it closely approximates the actual movement of a crawfish in the water.

I claim:
1. An articulated crawfish fishing lure, comprising:
a crawfish shaped head member;
at least one fishhook on the head member;
a generally longitudinally upwardly convex and downwardly concave shaped tail member;
said head and tail members having a pair of immediately adjacent confronting ends;
means pivotally interconnecting said pair of immediately adjacent confronting ends of said head and tail members for movement about a normally horizontal axis, only; and
means for fixedly connecting one end of a fishing line to the tail member intermediately of the pivot connection and the distal extremity of the tail member, said line connecting means being closer to the pivot connection than to the distal extremity of the tail member.

2. The lure of claim 1 wherein:
the tail member is arcuate in configuration and includes a passageway therethrough proximate the distal end thereof for receiving the fishing line therethrough, said passage way being vertically elongated to permit the tail member to pivotally oscillate vertically about the fishing line when the lure is pulled through water.

3. The lure of claim 2 wherein:
the means for connecting the fishing line comprises, a generally vertically oriented boss extending into the arcuate space encompassed by the tail member, said boss having an aperture therethrough.

4. The lure of claim 3 wherein:
the head member includes a pair of pincers and a pair of fishhooks extending adjacently to said pincers.

5. The lure of claim 4 wherein the tail member further comprises:
a pair of oppositely diverging arcuate portions extending from the respective sides thereof outwardly and rearwardly from the distal end of the tail member.

6. The lure of claim 5 wherein the pivotal connecting means comprises:
a generally vertically planar rearward extension on he head member loosely received in a slot in the proximate end of the tail member and a pin loosely pivotally securing said planar portion in said slot to permit relative vertical pivotal movement between the head and tail members.

References Cited
UNITED STATES PATENTS

| | | | |
|---|---|---|---|
| 1,297,617 | 3/1919 | Welles | 43—42.15 |
| 2,910,799 | 11/1959 | Wentworth | 43—42.15 X |
| 570,687 | 11/1896 | Stanley | 43—42.49 |
| 1,582,713 | 4/1926 | Welch | 43—42.48 X |
| 2,008,250 | 7/1935 | Haas | 43—42.15 |
| 2,234,439 | 3/1941 | Larson | 43—42.15 |
| 2,663,964 | 12/1953 | Martin | 43—42.02 |
| 2,758,409 | 8/1956 | Eslinger | 43—42.15 |
| 2,770,063 | 11/1956 | Martin | 43—42.39 X |
| 2,819,553 | 1/1958 | Fultz | 43—42.49 X |
| 3,034,249 | 5/1962 | Hawks | 43—42.15 |

SAMUEL KOREN, *Primary Examiner.*

U.S. Cl. X.R.

43—42.06, 42.34, 42.49